US007302576B2

(12) United States Patent
Greene et al.

(10) Patent No.: US 7,302,576 B2
(45) Date of Patent: Nov. 27, 2007

(54) SYSTEMS AND METHODS FOR AUTHENTICATING DOCUMENTS

(75) Inventors: Daniel H. Greene, Sunnyvale, CA (US); David Goldberg, Palo Alto, CA (US); Marshall W. Bern, San Carlos, CA (US)

(73) Assignee: XEROX Corporation, Stamford, CT (US)

( * ) Notice: Subject to any disclaimer, the term of this patent is extended or adjusted under 35 U.S.C. 154(b) by 768 days.

(21) Appl. No.: 10/248,138

(22) Filed: Dec. 19, 2002

(65) Prior Publication Data

US 2003/0131240 A1    Jul. 10, 2003

Related U.S. Application Data

(60) Provisional application No. 60/344,818, filed on Jan. 7, 2002.

(51) Int. Cl.
*H04L 9/00* (2006.01)
*G06K 9/20* (2006.01)
*G06K 9/36* (2006.01)

(52) U.S. Cl. .................. 713/176; 382/282; 382/288; 382/290; 382/291

(58) Field of Classification Search ................ 713/176
See application file for complete search history.

(56) References Cited

U.S. PATENT DOCUMENTS

| 4,868,877 | A  | * | 9/1989  | Fischer ..................... 713/157 |
| 5,872,848 | A  | * | 2/1999  | Romney et al. ............ 713/176 |
| 5,973,692 | A  | * | 10/1999 | Knowlton et al. .......... 715/835 |
| 6,085,322 | A  | * | 7/2000  | Romney et al. ............ 713/176 |
| 6,111,953 | A  | * | 8/2000  | Walker et al. ................ 380/51 |
| 6,453,416 | B1 | * | 9/2002  | Epstein ....................... 713/170 |
| 6,834,344 | B1 | * | 12/2004 | Aggarwal et al. .......... 713/176 |
| 6,907,527 | B1 | * | 6/2005  | Wu ............................. 713/176 |
| 7,016,536 | B1 | * | 3/2006  | Ling et al. .................. 382/190 |
| 2004/0059736 | A1 | * | 3/2004 | Willse et al. ................ 707/100 |

OTHER PUBLICATIONS

Secure Identification Documents Via Pattern Recognition and Public-Key Cryptography, Lawrence O'Gorman, Fellow, IEE, and Irina Rabinovich, IEEE Transactions On Pattern Analysis And Machine Intelligence, vol. 20, No. 10, Oct. 1998, 6 pp.

* cited by examiner

*Primary Examiner*—Gilberto Barron
*Assistant Examiner*—Virgil Herring
(74) *Attorney, Agent, or Firm*—Oliff & Berridge, PLC (57) ABSTRACT

Methods and systems for authenticating documents. Document data to be modified to contain authentication is inputted. A representation is determined from the document data. Assist information that is usable to reliably recover a determined representation is determined. A one-way hash of the representation and assist information is determined. The one-way hash is then cryptographically signed. The assist information and digitally signed one-way hash is then appended to the document.

39 Claims, 6 Drawing Sheets

SYSTEMS AND METHODS FOR AUTHENTICATING DOCUMENTS

BACKGROUND OF THE INVENTION

1. Field of Invention

This invention is directed to systems and methods for authenticating documents.

2. Description of Related Art

There are a number of situations where a sender transmits a document to a receiver and wants to assure the receiver that the document has not been altered during the transmission. In other words, the sender wants to authenticate the document.

Paper documents are traditionally authenticated either through elaborate printing techniques, such as, for example, money, or through trusted signatures and stamps, such as, for example, notarizing by a public notary. The signing and verifying processes of these current methods are not automated and require human intervention. Nor are these processes very reliable.

There are more recent methods that work on digital document data. During verification, these methods are applied to paper documents by acquiring a scanned image of the printed authenticated document. The resulting scanned image is then verified using some known verification scheme. These techniques, unfortunately, do not work well because, when the document is scanned by the receiver, the resulting scanned image usually differs from the original document content used during authentication. This occurs due to the noise inherent in scanning a document. The noise introduced by scanning makes it difficult to construct an authentication scheme that is resilient in view of the noise.

A method that authenticates photo-identification cards and has to cope with noise being introduced due to scanning is disclosed in "Secure Identification Documents Via Pattern Recognition and Public-Key Cryptography", by L. O'Gorman et al., IEEE Transactions on Pattern Analysis and Machine Intelligence, Vol. 20, No. 10, pages 1097-1102, October 1998. However, the authentication signature disclosed by O'Gorman et al. has a file size that is linear to the size of the photograph. This method does not scale well as the size of a document increases. The method disclosed in O'Gorman et al. would create an authentication file that would be large in comparison to the document. This tends to render the O'Gorman et al. method inefficient.

SUMMARY OF THE INVENTION

Due to the presence of noise in the scanning process of hard copy documents, conventional authenticating schemes cannot guarantee that the authenticated document is unchanged.

This invention provides systems and methods for authenticating a representation of at least a document.

This invention separately provides systems and methods that append a file to a document that allows a receiver to subsequently verify a representation of at least a portion of the document based on the appended file.

This invention separately provides systems and methods that append a file to a document that allows a receiver to reliably recreate a representation of at least a portion of the document based on the appended file.

This invention separately provides systems and methods for determining a representation of at least a portion of a document. This invention separately provides systems and methods for generating assist information from the representation that can be used to ensure that, during verification, the representation will be accurately recreated. This invention separately provides systems and methods for inputting the representation and the assist information into a hash function to generate a one-way hash of the representation and the assist information. This invention separately provides systems and methods for digitally signing the hash of the representation and the assist information, and appending the assist information and the digitally-signed hash of the representation and the assist information to the document.

This invention separately provides systems and methods for verifying a document by obtaining assist information and the digitally-signed hash of a representation of the document and the assist information that has been appended to the document. This invention separately provides systems and methods for reliably recovering the representation of at least a portion of the document using the assist information. This invention separately provides systems and methods for inputting the representation and the assist information into a hash function to generate a one-way hash of the representation and the assist information. This invention separately provides systems and methods for verifying the digital signatures used to create the digitally-signed assist information and hash appended to the document, and comparing the hash generated from the recovered representation and the assist information to the hash of the representation and the assist information that was appended to the document being verified.

This invention separately provides systems and methods for determining a representation of at least a portion of a document. This invention separately provides systems and methods for inputting a representation into a hash function to generate a one-way hash of the representation. This invention separately provides systems and methods for generating assist information from the representation that can be used to ensure that, during verification, the representation and the hash of the representation will be accurately recreated. This invention separately provides systems and methods for digitally signing the hash of the representation and/or the assist information, and appending the digitally-signed hash of the representation and/or the assist information to the document.

This invention separately provides systems and methods for verifying a document by obtaining the digitally-signed assist information and hash of a representation of the document that has been appended to the document. This invention separately provides systems and methods for verifying the digital signatures used to create the digitally-signed assist information and hash appended to the document. This invention separately provides systems and methods for reliably recovering the representation of at least a portion of the document using the assist information. This invention separately provides systems and methods for inputting the representation into a hash function to generate a one-way hash of the representation, and comparing the hash generated from the recovered representation to the hash that was appended to the document being verified.

This invention separately provides systems and methods that generate a self-contained notarized document where verification does not require reference to a remote digital copy of the document.

In various exemplary embodiments of the systems and methods according to this invention, a representation of at least a portion of a document is determined. Assist information for the representation is generated that can be used to ensure that, during verification, the representation will be accurately recreated. In various exemplary embodiments of the systems and methods according to this invention, the representation and the assist information are input into a hash function to generate a one-way hash of the representation and the assist information. In various exemplary embodiments of the systems and methods according to this invention, the hash of the representation and the assist information are digitally signed. In various exemplary embodiments of the systems and methods according to this invention, the assist information and the digitally-signed hash of the representation and the assist information are appended to the document.

In various exemplary embodiments of the systems and methods according to this invention, a document is verified by obtaining assist information and the digitally-signed hash of a representation of the document and the assist information that has been appended to the document. The obtained assist information is used to reliably recover the representation of at least a portion of the document. The representation and the assist information are input into a hash function to generate a one-way hash of the representation and the assist information. In various exemplary embodiments of the systems and methods according to this invention, at some earlier time, the digitally-signed hash and assist information appended to the document being verified were checked to verify the digital signature. The hash and assist information generated from the recovered representation are then compared to the hash and assist information that was appended to the document being verified. If they are sufficiently close, the document being verified is authenticated.

In various other exemplary embodiments of the systems and methods according to this invention, document authentication is accomplished by acquiring document data of a document. The acquired document data can be one or more portions of the contents of the document. A representation of at least a portion of the document is then determined from the acquired document data, and assist information on how to reliably reproduce the determined representation is generate from the acquired document data. A one-way hash function is then applied to the determined representation to obtain a hash of the determined representation. The hash and/or the assist information are digitally signed and then appended to the document.

In various other exemplary embodiments of the systems and methods according to this invention, document verification is accomplished by acquiring document image data from a copy of the document. The signature used to sign the digitally-signed hash and/or the assist information is decoded from the acquired document image data. The signature used to sign the digitally-signed hash and/or the assist information is then verified. If the signature is valid, the representation of the document is determined using the assist information appended to the document. That is, the assist information is used to recover the determined representation. The one-way hash function is then used to generate the hash of the recovered representation. The obtained hash is then compared to hash that was appended to the copy of the document. If the hashes do not match, the document is determined to have been altered sometimes after the hash of the representation was generated and appended to the document, i.e., the document is not authentic. Otherwise, the document can be considered to be authentic.

In various exemplary embodiments, the determined representation of the document is one or more strings of text. In various exemplary embodiments, the strings of text are ASCII text strings. In various other exemplary embodiments, the determined representation includes locations and/or features of connected components occurring in the document image. In various exemplary embodiments, the locations and/or features of connected components include positions of centroids, shapes, membership thresholds, and/or sizes of the connected components.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

As used herein, the term "authenticate" will refer to generating authentication information for inclusion in a document. This term can also encompass as the process of generating an on-paper signature for the document. The term "verify" is used herein to refer to the process of checking the document and the included authenticating information to determine if the document is authentic.

Due to the presence of noise in the scanning process of hard copy documents, conventional digital authenticating schemes cannot guarantee that the authenticated document is unchanged. This invention provides systems and methods for authenticating and verifying documents to detect such changes or confirm that the document is unchanged. The various exemplary embodiments of the systems and methods according to this invention will detect substantially all changes to the representation. The choice of representation determines what is considered to be significant for any particular document. For example, if changes to the text are considered significant, a suitable representation would be the ASCII text of the document. For black and white document, one may also care about changes in positions of characters. In this case, this information can also be included in the representation. The representation may focus on specific portions of the document.

In various exemplary embodiments of the systems and methods according to this invention, a signer or sender of a document creates assist information, which is, for example, stored in a file. The assist information will include information and/or hints usable by the verifier and/or receiver to reliably recover a representation of at least a portion of the document that was used in generating a hash that is appended to the authenticated document. The hash can optionally include the assist information.

In some form, both the representation and the assist information are digitally signed. In various exemplary embodiments, a hash of both the representation and the assist information is generated. This hash is then digitally signed and appended, with an unsigned copy of the assist information, to the document data. In various other exemplary embodiments, a hash of just the representation is generated. The assist information and this hash are then digitally signed and appended to the document data. In still various other exemplary embodiments, a hash of just the representation is generated. Then, another hash of just the assist information is generated. These two hashes are then digitally signed and appended, with an unsigned copy of the assist information, to the document data. The digitally-signed hash and assist information, or the unsigned assist information and the digitally-signed hash, are encoded into bar codes, glyph-blocks or the like. The bar codes, glyph blocks or the like are then printed on a copy of the document. The document is then transmitted to the receiver and/or to the verifier.

Upon receiving the document, if the appended data is encoded, the receiver and/or the verifier first decodes the appended one or more digitally signed hashes, and the appended assist information, which may or may not be digitally signed. After the appended data is decoded, if necessary, the verifier attempts to verify that the sender or signer created the digital signature. After the digital signature is verified, the representation will be determined using the assist information so that the representation is reliably recovered. In various exemplary embodiments where the assist information is not digitally signed, the assist information can be used without first verifying the digital signature. In such cases, verifying the digital signature can be delayed.

In various exemplary embodiments, the verifier will generate a hash based on the recovered representation, which, in view of the assist information, should be the same representation of the document as used by the sender. In various other exemplary embodiments, the hash will be generated based on the representation and the assist information. In still other various exemplary embodiments, two hashes, one generated based on just the representation, and another based just on the assist information, can be generated. If the one or more hashes generated by the receiver and/or the verifier are the same as the one or more hashes provided by the sender and/or the signer, then the document has not been altered during transmission. If the values are different, then the receiver and/or the verifier determine that the document has been altered since it was digitally signed by the signer.

Figure 1:
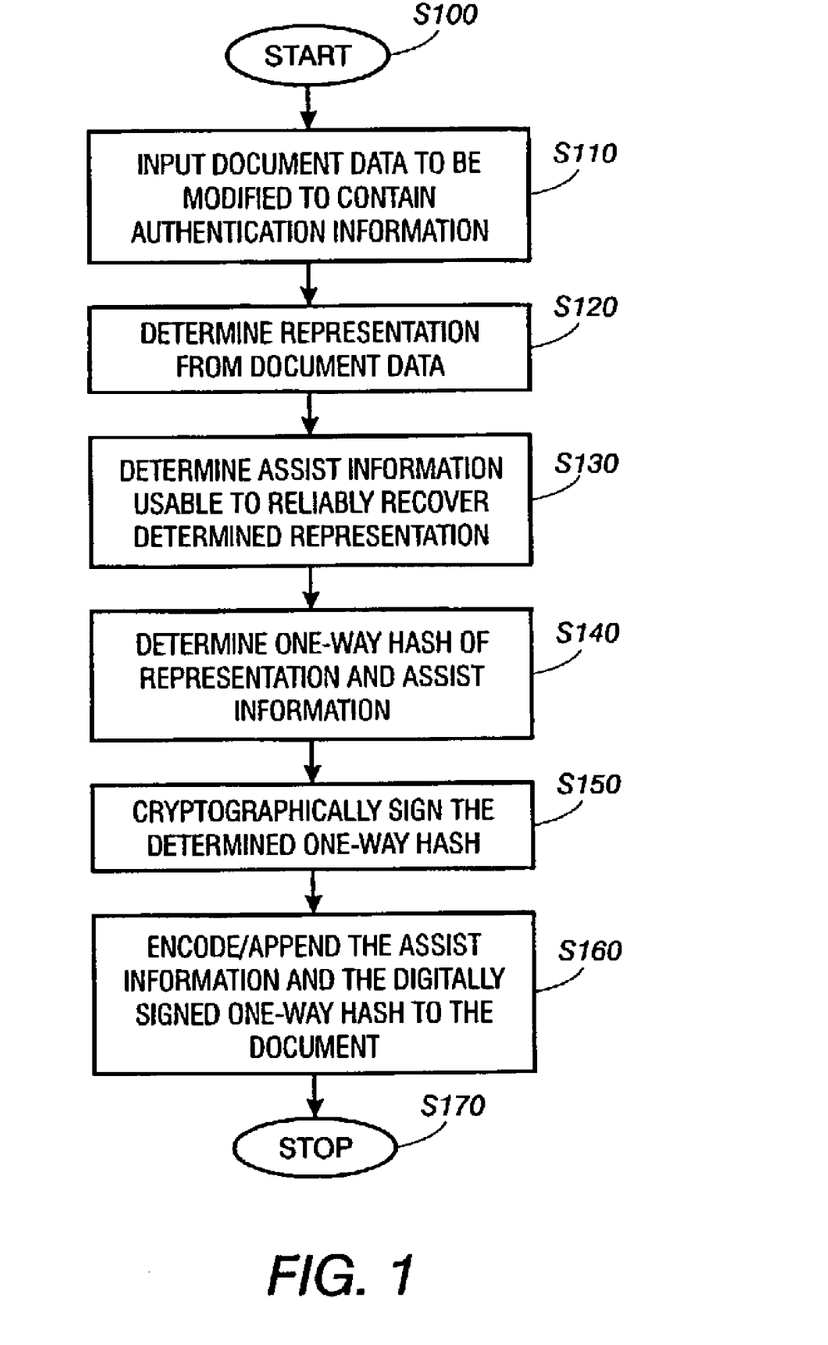
FIG. 1 is a flowchart outlining a first exemplary embodiment of a method for authenticating a document according to this invention.

FIG. 1 is a flowchart outlining a first exemplary embodiment of a method for authenticating a document according to this invention. As shown in FIG. 1, operation of the method begins in step S100, and continues to step S110, where the document data to be authenticated by modifying the document data or a copy of the document to contain authentication information is input. Next, in step S120, a representation of the document is determined. Then, in step S130, assist information usable to reliably recover the determined representation is generated. Operation then continues to step S140.

In step S140, a one-way hash of the assist information and the representation is generated. Next, in step S150, the one-way hash of the assist information and the representation is digitally signed. Then, in step S160, the assist information and the digitally signed one-way hash are appended to document data, or to a tangible copy of the document, to sign and/or authenticate the document. Operation then continues to step S170, where operation of the method ends. In various exemplary embodiments, the assist information and the digitally-signed one-way hash are encoded using glyphs, bar-codes, or the like before they are appended to the document data or to the tangible copy of the document.

Figure 2:
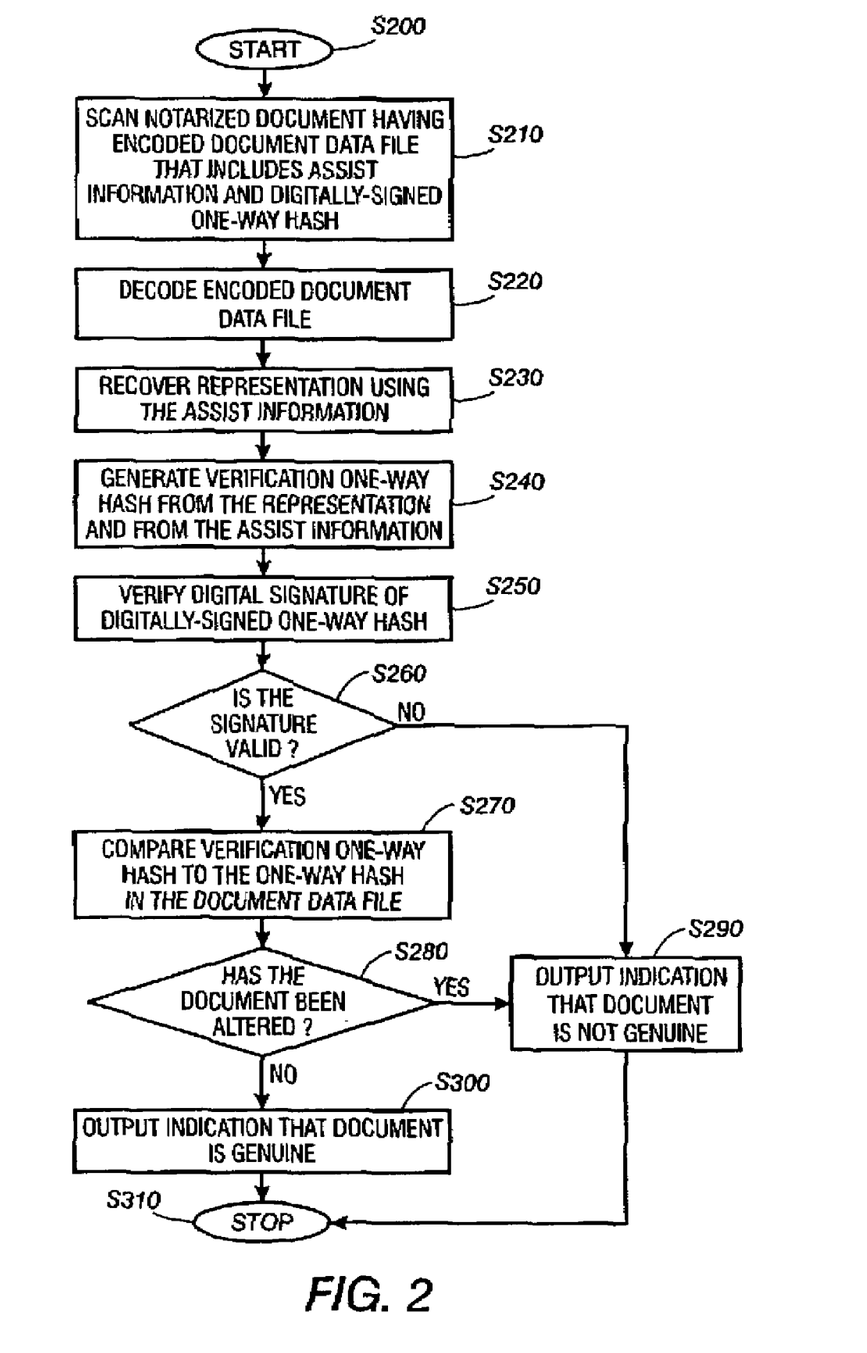
FIG. 2 is a flowchart outlining a first exemplary embodiment of a method for verifying a document according to this invention corresponding to the authentication method outlined in FIG. 1.

FIG. 2 is a flowchart outlining a first exemplary embodiment of a method for verifying a document according to this invention. As shown in FIG. 2, operation of the method begins in step S200, and continues to step S210, where a notarized, or signed or authenticated document, to which an encoded document data file having assist information and a digitally signed one-way hash has been appended, is input. Then, in step S220, the encoded appended assist information and one-way hash is decoded. Next, in step S230, the assist information is used to recover the desired representation of the document from the input document data. Operation then continues to step S240.

In step S240, a verification one-way hash is generated from the recovered representation and from the assist information. Next, in step S250, the digital signature used to digitally sign the appended one-way hash of the representation and the assist information is analyzed to determine if it is a valid signature. Then, in step S260, a determination is made whether the digital signature is valid. If the digital signature is a valid signature, operation continues to step S270. Otherwise, operation jumps to step S290.

In step S270, the verification one-way hash generated in step S240 is compared to the appended one-way hash. Then, in step S280, based on the comparison, a determination is made whether the document has been altered since it was authenticated. If so, operation continues to step S290. Otherwise, operation jumps to step S300.

In step S290, an indication is output that the digital signature used to sign the assist channel is not the correct digital signature for the person purported to have signed the appended data or that the comparison failed. Operation then jumps to step S310.

In contrast, in step S300, an indication is output that the document can be authenticated and thus is probably genuine. Operation then continues to step S310, where operation of the method ends.

Figure 3:
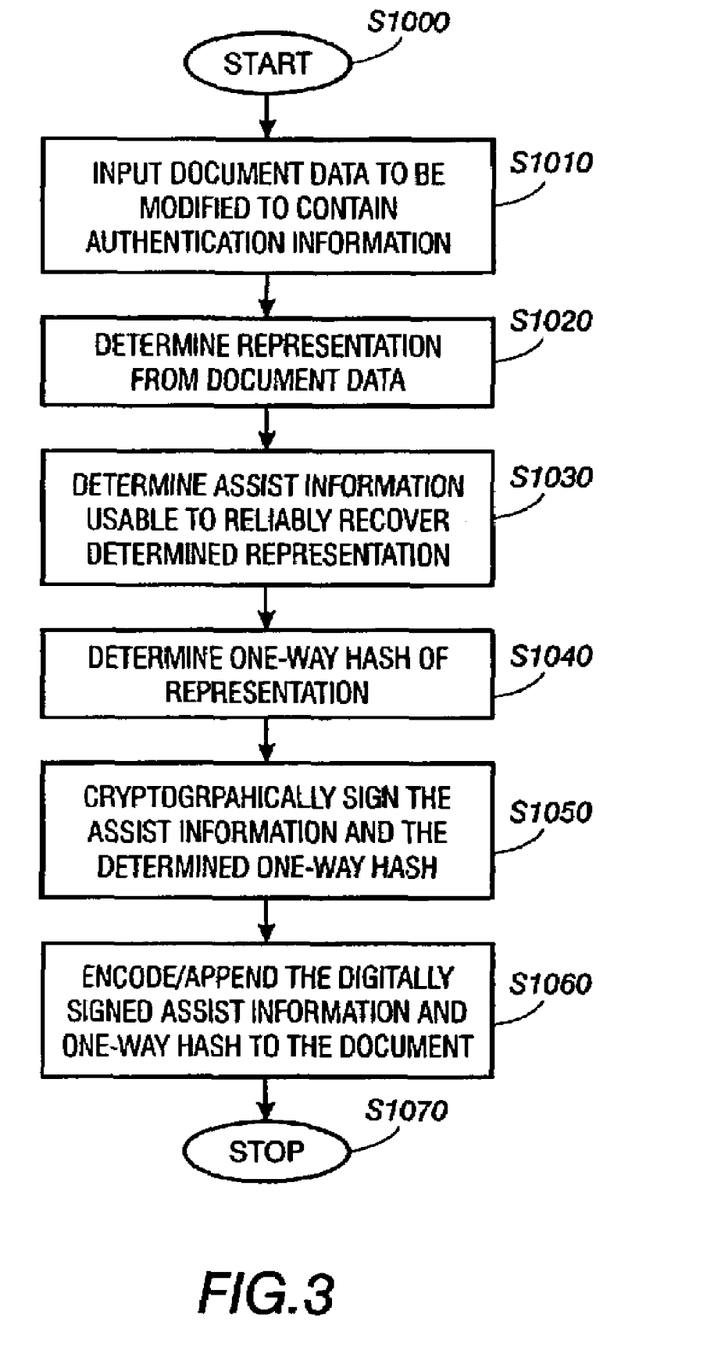
FIG. 3 is a flowchart outlining a second exemplary embodiment of a method for authenticating a document according to this invention.

FIG. 3 is a flowchart outlining a second exemplary embodiment of a method for authenticating a document according to this invention. As shown in FIG. 3, operation of the method begins in step S1000, and continues to step S1010, where the document data to be authenticated by modifying the document data or a copy of the document to contain authentication information is input. Next, in step S1020, a representation of the document is determined. Operation then continues to step S1030.

In step S1030, assist information usable to reliably recover the determined representation is generated. Next, in step S1040, a one-way hash of the representation is generated. It should be appreciated that steps S1030 and S1040 can be performed in the opposite order, or simultaneously. Then, in step S1050, the assist information and the one-way hash of the representation is digitally signed. Then, in step S1060, the digitally signed the assist information and the one-way hash of the representation are appended to document data, or to a tangible copy of the document, to sign and/or authenticate the document. Operation then continues to step S1070, where operation on the method ends. In various exemplary embodiments, the digitally-signed assist information and one-way hash are encoded using glyphs, bar-codes, or the like before they are appended to the document data or to the tangible copy of the document.

Figure 4:
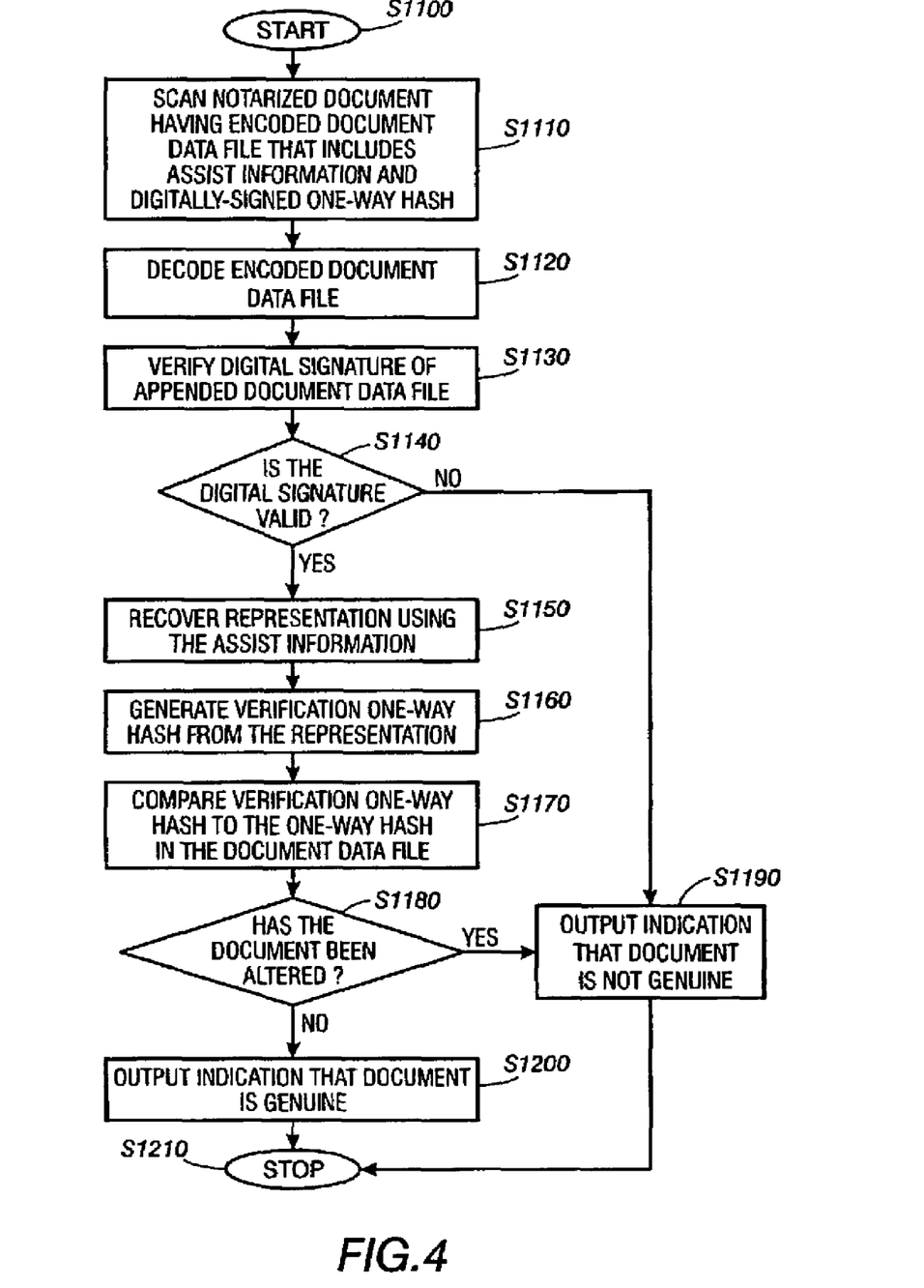
FIG. 4 is a flowchart outlining a second exemplary embodiment of a method for verifying a document according to this invention corresponding to the authentication method outlined in FIG. 3.

FIG. 4 is a flowchart outlining a first exemplary embodiment of a method for verifying a document according to this invention. As shown in FIG. 4, operation of the method begins in step S1100, and continues to step S1110, where a notarized, or signed or authenticated document, to which an encoded document data file having digitally-signed assist information and a one-way hash have been appended, is input. Then, in step S1120, the encoded appended assist information and one-way hash is decoded. Next, in step S1130, the digital signature used to digitally sign the appended assist information and one-way hash of the representation is analyzed to determine if it is a valid signature. Then, in step S1140, a determination is made whether the digital signature is valid. If the digital signature is a valid signature, operation continues to step S1150. Otherwise, operation jumps to step S1190.

In step S1150, the assist information is used to recover the desired representation of the document from the input document data. Next, in step S1160, a verification one-way hash is generated from the recovered representation. Then, in step S1170, the verification one-way hash generated in step S1160 is compared to the appended one-way hash. Next, in step S1180, based on the comparison, a determination is made whether the document has been altered since the authentication information was generated. If so, operation continues to step S1190. Otherwise, operation jumps to step S1200.

In step S1190, an indication is output that the digital signature used to sign the assist channel is not the correct digital signature for the person purported to have signed the appended data or that the comparison failed. Operation then jumps to step S1210. In contrast, in step S1200, an indication is output that the document can be authenticated and thus is probably genuine. Operation then continues to step S1210, where operation of the method ends.

Figure 5:
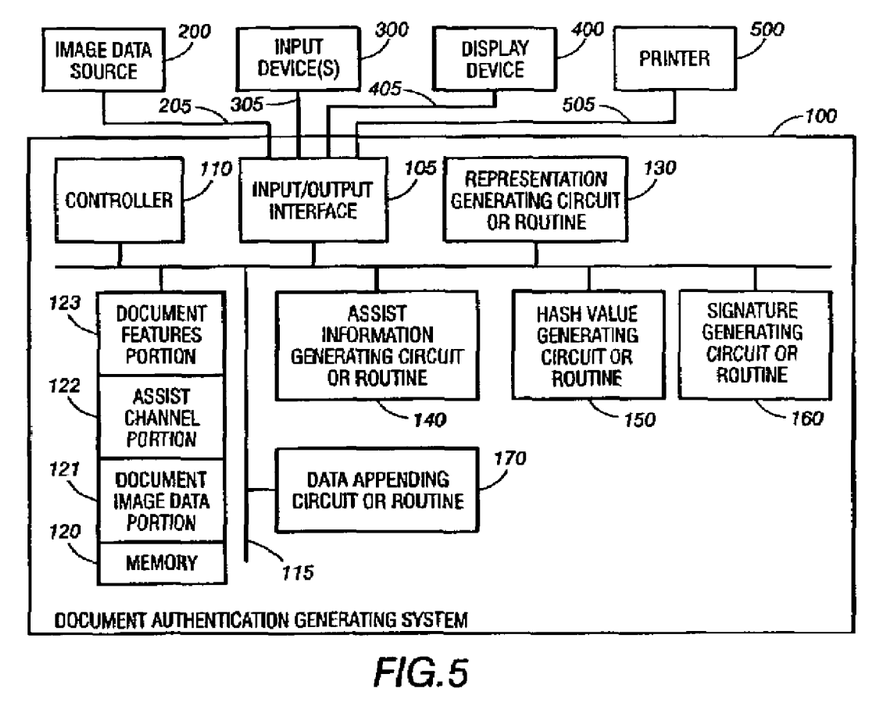
FIG. 5 is a block diagram of one exemplary embodiment of a document authentication generating device according to this invention.

FIG. 5 shows one exemplary embodiment of a document authentication device 100 implementing the systems and methods for document authentication according to this invention. As shown in FIG. 5, the document authentication device 100 includes an input/output interface 105, a controller 110, a memory 120, a representation determining circuit, routine or manager 130, a assist information determining circuit, routine or manager 140, a hash value generating circuit, routine or manager 150, a data compressing circuit, routine or manager 155, a signature generating circuit, routine or manager 160, and a data appending circuit, routine or manager 170, interconnected by a control/data bus 115.

The memory 120 includes a document image data portion 121, an assist information portion 122 and a representation portion 123. It should be appreciated that these are functional and not physical portions of the memory 120. In various exemplary embodiments, the assist information can include any information usable to reliably recreate any desired representation determined by the representation determining circuit routine or manager 130.

As shown in FIG. 5, an image data source 200, one or more input devices 300, a display device 400 and/or a printer 500 can be connected to the document authentication device 100 over links 205, 305, 405 and 505, respectively.

Figure 6:
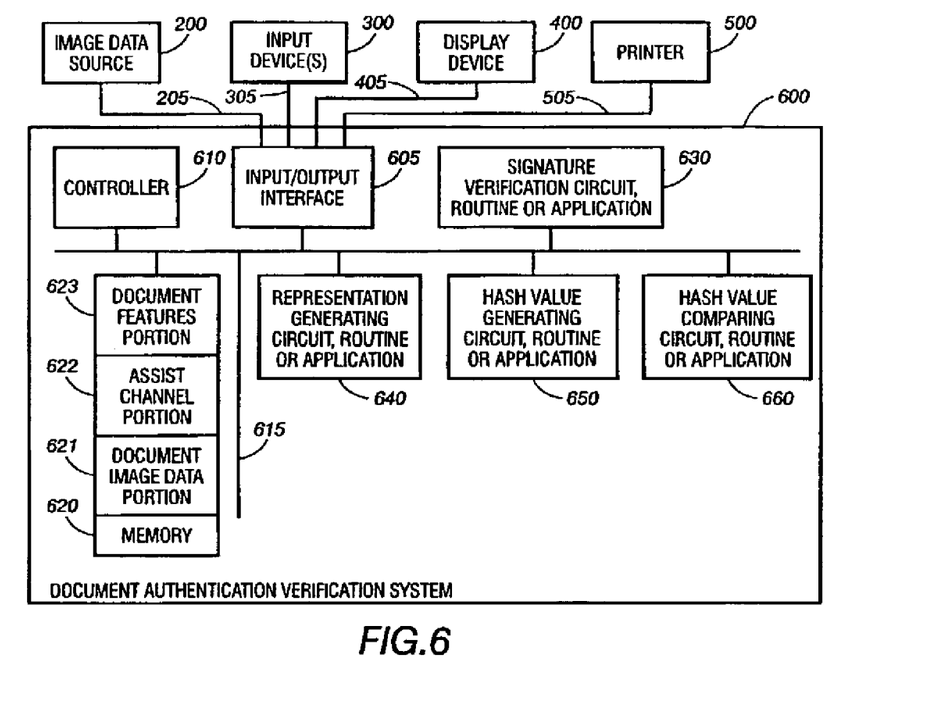
FIG. 6 is a block diagram of one exemplary embodiment of a document verification device according to this invention.

FIG. 6 shows one exemplary embodiment of a document verification device 600 implementing the systems and methods for document verification according to this invention. As shown in FIG. 6, the document verification device 600 includes an input/output interface 605, a controller 610, a memory 620, a signature verification circuit, routine or manager 630, a representation determining circuit, routine or manager 640, a hash value generating circuit, routine or manager 650 and a comparing circuit, routine or manager 660, interconnected by a control/data bus 615.

As shown in FIGS. 5 and 6, an image data source 200, one or more input devices 300, a display device 400 and a printer 500 are connected to the document authentication device 600 over links 205, 305, 405 and 505, respectively.

In general, the image data source 200 shown in FIGS. 5 and 6 can be any one of a number of different sources, such as general-purpose computer, a scanner, a digital copier, a facsimile device that is suitable for generating electronic image data, or a device suitable for storing and/or transmitting electronic image data, such as a client or server of a network, or the Internet, and especially the World Wide Web. For example, the image data source 200 may be a scanner, or data carrier such as a magnetic storage disk, CD-ROM or the like, or host computer, that contains document data and/or scanned image data.

In general, the image data source 200 can be any known or later developed source that is capable of providing document data and/or image data to the document authentication device 100 and the document verification device 600, of this invention respectively. It should be understood that the image data source 200 of FIGS. 5 and 6 does not need to be the same type of device.

The image data source 200 can be integrated with the document authentication device 100, such as in a digital copier having an integrated scanner. Alternatively, the link 205 connecting the image data source 200 to the document authentication devices 100 can be a connection device, such as a modem, a local area network, a wide area network, and intranet, the Internet, any other distributed processing network, or any other known or later developed connection device. Similar relative connections may be made between the image data source 200 and the document verification device 600. Further, the image data source 200 is also adapted to provide a data file that is appended to the document by the signer. The appended data may be encoded using glyphs, a bar code, or any other known or later-developed technique for encoding data into a printed image.

Each of the links 205-505 can be any known or later-developed device or system for connecting the respective devices to the document authentication device 100 and the document verification device 600, respectively, including a direct cable connection, a connection over a wide area network or a local area network, a connection over an intranet, a connection of the Internet, or a connection over any other distributed processing network or system. It should be appreciated that any of these connectors can be either wired or wireless. In general, each of the links 205, 305, 405, 505 can be any known or later-developed connection system or structure usable to connect the respective devices to the document authentication device 100 or the document verification device 600, respectively. It should be understood that the links 205, 305, 405, 505 do not need to be of the same type.

Each of the respective one or more input devices 300 may be any combination of one or more input devices, such as a keyboard, a mouse, a joy stick, a trackball, a touch pad, a touch screen, a pen-based system, a microphone and associated voice recognition software, or any other known or later-developed device for inputting user commands to the document authentication device 100 and the document verification device 600, respectively. It should be understood that the respective one or more input devices 300 of FIGS. 5 and 6 do not need to be the same type of device.

The display device 400 may be a monitor that is capable of displaying an electronic version of the resulting document image for viewing or displaying any other intermediary steps of the document authentication and verification process. The display 400 is optional and thus may be omitted. It should be understood that the display 400 of FIGS. 5 and 6 does not need to be the same type of device. The printer 500 can be any known or later-developed image-forming device that is capable of printing a tangible copy of an image. It should also be understood that the printer 500 of FIGS. 5 and 6 do not need to be the same type of device.

It should be appreciated that the image data source 200, the one or more input devices 300, the display 400, and the printer 500 do not have to be locally associated with the document authentication device 100. Furthermore, it should be appreciated that the document authentication device 100, and any one or more of the image data source 200, the one or more input devices 300, the display 400 and the printer 500 can be elements integrated into a single device, such as a photocopier or the like. Furthermore, it should also be appreciated that any number of these devices may be integrated into a single device to cooperate with the remaining devices.

As shown in FIGS. 5 and 6, the memory 120 can be implemented using any appropriate combination of alterable, volatile, or non-volatile memory or non-alterable, or fixed memory. The alterable memory, whether volatile, or non-volatile, can be implemented using any one or more of static or dynamic RAM, a floppy disk and disk drive, a writable or rewritable optical disk and disk drive, a hard drive, flash memory or the like. Similarly, the non-alterable or fixed memory can be implemented using any one or more of ROM, PROM, EPROM, EEPROM, and gaps an optical ROM disk, such as a CD-ROM or DVD-ROM disk, and disk drive or the like.

Each of the various embodiments of the document authentication device 100 and the document verification device 600 can be implemented as software executing on a programmed general purpose computer, a special purpose computer, a microprocessor or the like. Alternatively, each of the various embodiments of the document authentication device 100 and the document verification device 600 can be implemented as a routine embedded in a printer driver, as a resource residing on a server, or the like. Each of the various embodiments of the document authentication device 100 and the document verification device 600 can also be implemented by physically incorporating that device into a software and/or hardware system, such as the hardware and software system of a printer or a digital photocopier. It should be understood that each of the various embodiments of the document authentication device 100 and the document verification device 600 do not need to be implemented the same way.

It should also be understood that each of the circuits, routines or managers shown in FIGS. 5 and 6 can be implemented as portions of a suitably programmed general-purpose computer. Alternatively, each of the circuits, routines or managers shown in FIGS. 5 and 6 can be implemented as physically distinct hardware circuits within an ASIC, using a digital signal processor (DSP) or using a FPGA, a PDL, a PLA and/or a PAL, or using discrete logic elements or discrete circuit elements. The particular form each of the circuits, routines or managers shown in FIGS. 5 and 6 will take is a design choice and will be obvious and predicable to those skilled in the art. It should be appreciated that the circuits, routines or managers shown in FIGS. 5 and 6 do not need to be of the same design.

When operating the document authentication device 100, a user instructs the document authentication device 100 through one or more of the one or more input devices 300 over the link 305 to notarize or authenticate a document, as shown in FIG. 5. Document data, such as electronic document data, such as ASCII text data, or an image of the document, to be notarized or authenticated is received by the document authentication device 100 from the image data source 200 via the link 205 at the input/output interface 105. The input/output interface 105 inputs the input image data, and, under direction of the controller 110, forwards it to the document image data portion of the memory 120.

The representation determining circuit, routine or manager 130 then retrieves the image data from the image data portion 121 of the memory 120 under control of the controller 110 and determines one or more portions of the document that will be used as a representation of the document when authenticating and verifying the document. It should be appreciated that any one or more known or later developed types of representation can be determined by the representation determining circuit, routine or manager 130, and in any desired combination. In various exemplary embodiments, the representation can be ASCII text data of one or more lines of electronic image data selected from the document data. In various other exemplary embodiments, the representation can be any number of document features obtainable from connected components present in the document data. Various exemplary embodiments of document features obtainable from connected components present in the document data are disclosed in U.S. patent application Ser. No. 10/322,744, now U.S. Pat. No. 7,130,445, filed herewith and incorporated herein by reference in its entirety.

In a first exemplary embodiment of the operation of the document authentication device 100, the determined representation stored in the representation portion 123 of the memory 120 is then output, under control of the controller 110 to the assist information determining circuit, routine or manger 140. Alternatively, the representation determining circuit, routine or manager 130 can directly output, under control of the controller 110, the determined representation to the assist information determining circuit as well as to the representation portion 122 of the memory 120.

The assist information determining circuit, routine or manager 140 inputs the determined representation and determines and outputs assist information about the determined representation to the memory 120 to be stored in the assist information portion 122 under control of the controller 110. The assist information generated by the assist information determining circuit, routine or manager 140 can include any desired information that will allow the verification device 600 to reliably recover the representation.

The hash value generating circuit, routine or manager 150 inputs the representation determined by the representation determining circuit or routine 130 and the assist information generated by the assist information generating circuit or routine 140 from the memory 120 and determines one or more hash values based on the determined representation and the generated assist information. The hash value generating circuit, routine or manager 150 outputs the one or more hash values to the memory 120, under control of the controller 120, to be stored in any desired portion of the memory 120. In various exemplary embodiments, the hash value generating circuit, routine or manager 150 determines cryptographically secure hash values.

In various exemplary embodiments, the hash value generating circuit, routine or manager 150 determines a hash value using any known or later-developed hashing technique. In various exemplary embodiments, the hash value generating circuit, routine or manager 150 determines the hash value using a sequential hashing technique.

The signature generating circuit, routine or manager 165 inputs the one or more hash values generated from the representation and the assist information stored the memory 120 and digitally signs this data. The digitally-signed one or more hash values are then output, under control of the controller 110, to any desired portion of the memory 120. In various exemplary embodiments, the signature generating circuit, routine or manager 165 uses any known or later-developed digital signing technique. In various exemplary embodiments, the signature generating circuit, routine or manager 165 uses a known encryption technique to digitally sign the one or more hash values. It should be understood that the signature generating circuit routine or manager 165 can optionally be omitted from the document authentication device 100.

The data appending circuit, routine or manager 170 inputs the digitally-signed one or more hash values stored in the memory 120 and the assist information stored in the assist information portion 122 and appends the input data to the document image data or directly to a copy of the document. In various exemplary embodiments, the data appending circuit routine or manger 170 converts digitally-signed one or more hash values stored in the memory 120 and the assist information stored in the assist information portion 122 into a format, such as, but not limited to, data glyphs or bar codes, before it is appended to the document image data.

In various exemplary embodiments, the data appending circuit routine or manager 170 adds the appended data, whether in machine-readable format or human-readable format, to the document image data stored in the document image data portion 122. In this case, a tangible copy of the digitally signed document is generated by printing the document image data stored in the document image data portion 122. Alternatively, the data appending circuit, routine or manager 170, under control of the controller 110, appends the machine-readable or human-readable data to a tangible copy of the document. In this case, the user places a tangible copy of the document on the printer 500. The printer 500 then receives the appended machine-readable or human readable data from the document authentication device 100 over the link 505. The appended data is then added to the original tangible copy of the document.

In a second exemplary embodiment of the operation of the document authentication device 100, the determined representation stored in the representation portion 123 of the memory 120 is output, under control of the controller 110 to both the assist information determining circuit, routine or manger 140 and to the hash value generating circuit, routine or manager 150. Alternatively, the document feature generating circuit, routine or manager 130 can directly output, under control of the controller 110, the determined document features to both the document features information determining circuit and to the hash value generating circuit, routine or manager 150 as well as to the representation portion 123 of the memory 120.

The assist information determining circuit, routine or manager 140 inputs the determined representation and determines and outputs assist information about the determined representation to the memory 120 to be stored in the assist information portion 122 under control of the controller 110. The assist information generated by the assist information determining circuit, routine or manager 140 can include any desired information that will allow the verification system 600 to reliably recover the representation.

The hash value generating circuit, routine or manager 150 inputs the representation and determines one or more hash values based on the determined representation. The hash value generating circuit, routine or manager 150 outputs the one or more hash values to the memory 120, under control of the controller 120, to be stored in any desired portion of the memory 120. In various exemplary embodiments, the hash value generating circuit, routine or manager 150 determines cryptographically secure hash values.

In various exemplary embodiments, the hash value generating circuit, routine or manager 150 determines a hash value using any known or later-developed hashing technique. In various exemplary embodiments, the hash value generating circuit, routine or manager 150 determines the hash value using a sequential hashing technique.

The signature generating circuit, routine or manager 165 inputs the assist information stored in the assist information portion 122 of the memory 120 and the one or more hash values generated from the representation and digitally signs the assist information and the one or more hash values. The digitally-signed assist information and one or more hash values are then output, under control of the controller 110, to any desired portion of the memory 120. In various exemplary embodiments, the signature generating circuit, routine or manager 165 uses any known or later-developed digital signing technique. In various exemplary embodiments, the signature generating circuit, routine or manager 165 uses a known encryption technique to digitally sign the assist information and the one or more hash values. It should be understood that the signature generating circuit routine or manager 165 can optionally be omitted from the document authentication device 100.

The data appending circuit, routine or manager 170 inputs the digitally-signed the assist information one or more hash values stored in the memory 120 and stored in the memory 120 and appends the input data to the document image data or directly to a copy of the document. In various exemplary embodiments, the data appending circuit routine or manger 170 converts the digitally-signed the assist information and the one or more hash values stored in the memory 120 into a format, such as, but not limited to, data glyphs or bar codes, before it is appended to the document image data.

In various exemplary embodiments, the data appending circuit routine or manager 170 adds the appended data, whether in machine-readable format or human-readable format, to the document image data stored in the document image data portion 122. In this case, a tangible copy of the digitally signed document is generated by printing the document image data stored in the document image data portion 122. Alternatively, the data appending circuit, routine or manager 170, under control of the controller 110, appends the machine-readable or human-readable data to a tangible copy of the document. In this case, the user places a tangible copy of the document on the printer 500. The printer 500 then receives the appended machine-readable or human readable data from the document authentication device 100 over the link 505. The appended data is then added to the original tangible copy of the document.

When operating the document verification device 600, a user instructs the document verification device 600 through one or more of the one or more input devices 300 over the link 305 to verify a document, as shown in FIG. 6. The document to be verified includes appended data that has been digitally signed and that includes document features and/or an assist channel. Document image data of the document to be verified is received by the document verification device 600 from the image data source 200 via the link 205 and the input/output interface 605. The input/output interface 605 inputs the input image data, and under direction of the controller 610, forwards the received document image data to the document image data portion 621 of the memory 620.

The signature verification circuit, routine or manager 630 inputs the appended data and decodes it from the machine-readable format into one or more hash values and assist information. The assist information is stored into an assist information portion 622 of the memory 620. The one or more hash values are stored into any desired portion of the memory 120.

The signature verification circuit, routine or manager 630 checks the decoded digitally-signed data to verify the digital signature used to digitally sign the appended data is the correct digital signature for the purported signer of the document. The signature verification circuit, routine or manager 630 can use any known or later-developed digital signature verification technique to verify that the digital signature used to digitally sign the appended data is that of the purported signer.

If the digital signature is that of the purported signer, then the document verification device 600 has verified that the purported signer actually signed and created the digitally-signed appended data. In this case, the document verification device 600 can proceed, by verifying that the received document is substantially identical to the document digitally signed by the signer in essentially all significant respects by determining one or more hash values from the received document image data based on the assist information contained in the appended data and comparing the one or more verification hash values to the signer's corresponding one or more hash values contained in the appended data.

In contrast, in various exemplary embodiments, if the digital signature is not that of the purported signer, the document verification device 600 stops the verification process on that document. Alternatively, assuming the appended data can be decrypted in view of any encryption applied to it, the appended data is analyzed as outlined above to verify that the content of the document is substantially identical to the content of the signed document. However, in this case, the document is flagged as having an unverified signature.

The representation determining circuit, routine or manager 640 inputs the document image data and determines, or recovers, a desired representation of one or more portions of the document image data. The determined representation is stored in the representation portion 623 of the memory 620 under control of the controller 610. In various exemplary embodiments, the representation determining circuit, routine or manager 640 additionally or alternatively outputs the determined representation to the hash circuit, routine or manager 650.

The representation determining circuit, routine or manager 640 inputs the document image data and the assist information. The representation determining circuit, routine or manager 640 determines each desired representation in view of the assist information stored in the assist information portion 622 to ensure that the recovered representation generally matches the representation that was determined from the original document data by the document authentication device 100 and used by the document authentication device 100 to generate the appended hash values.

In various exemplary embodiments, the desired representation is an optical character recognition of one or more text strings that occur in the document. U.S. patent application Ser. Nos. 09/574,268, 09/574,270, 09/574,274 and 09/574,406 each incorporated herein by reference in its entirety, disclose a number of methods for reliably recovering such text strings using optical character recognition and various types of assist information. In various other exemplary embodiments, the desired representation includes various connected components that occur in the document. The incorporated U.S. patent application Ser. No. 10/322,744, now U.S. Pat. No. 7,130,445, application discloses various methods for reliably recovering connected component information using assist information.

At this point, the document verification device 600 should have established a significant matching of the recovered representation with the representation as used by the document authentication device 100 when generating the one or more hash values. Accordingly, the hash value generating circuit, routine or manager 650 performs exactly the same hashing steps as outlined above with respect to the hash value generating circuit, routine or manager 150 of the document authentication device 100.

In a first exemplary embodiment of the operation of the document verification device 600, the hash value generating circuit, routine or manager 650 inputs the recovered representation from the representation portion 623 and the assist information from the assist information portion 622 of the memory 620 and determines one or more verifier hash values from the recovered representation and the assist information. The hash value generating circuit, routine or manager 650 outputs the one or more verifier hash values to the memory 620 under control of the controller 610. The hash value generating circuit, routine or manager 650 determines the one or more verifier hash values using the same known or later-developed hashing techniques as the hash value generating circuit, routine or manager 150. In various exemplary embodiments, the hash value generating circuit, routine or manager 650 determines the one or more verifier hash values using a sequential hashing technique.

The hash value comparing circuit, routine or manager 660 inputs one or more verifier hash values and corresponding one or more authentication hash values from the memory 620. The hash value comparing circuit, routine or manager 660 compares each of the one or more verifier hash value to the corresponding ones of the one or more authentication hash values. If the respective hash values are about equivalent, then the hash value comparing circuit, routine or manager 660 outputs a signal or an indication via the input/output interface 605 to the display device 400 over the link 405 and/or to the printer 500 over the link 505 that the document is unchanged from the signed document image data. If the respective hash values are not about equivalent, then the hash value comparing circuit, routine or manager 660 outputs, under control of the controller 610, a signal or indication via the input/output interface 605 to the display device 400 over the link 405 and/or to the printer 500 over the link 505 that the document has been altered since the authentication hash values were generated.

It should be appreciated that, since, in the first exemplary embodiment of the operation of the verification device 600, only the hash of the assist information and the representation is digitally signed, the signature verification circuit, routine or manager 630 does not need to check the signature until just before the hash value comparing circuit, routine or manager 660 needs to input the one or more authentication hash values. In this case, the digitally-signed hash values are stored in the memory 620.

In a second exemplary embodiment of the operation of the document verification device 600, the hash value generating circuit, routine or manager 650 inputs the recovered representation from the representation portion 623 and determines one or more verifier hash values from the recovered representation. The hash value generating circuit, routine or manager 650 outputs the one or more verifier hash values to the memory 620 under control of the controller 610. The hash value generating circuit, routine or manager 650 determines the one or more verifier hash values using the same known or later-developed hashing techniques as the hash value generating circuit, routine or manager 150. In various exemplary embodiments, the hash value generating circuit, routine or manager 650 determines the one or more verifier hash values using a sequential hashing technique.

The hash value comparing circuit, routine or manager 660 inputs one or more verifier hash values and corresponding one or more authentication hash values from the memory 620. The hash value comparing circuit, routine or manager 660 compares each of the one or more verifier hash value to the corresponding ones of the one or more authentication hash values. If the respective hash values are about equivalent, then the hash value comparing circuit, routine or manager 660 outputs a signal or an indication via the input/output interface 605 to the display device 400 over the link 405 and/or to the printer 500 over the link 505 that the document is unchanged from the signed document image data. If the respective hash values are not about equivalent, then the hash value comparing circuit, routine or manager 660 outputs, under control of the controller 610, a signal or indication via the input/output interface 605 to the display device 400 over the link 405 and/or to the printer 500 over the link 505 that the document has been altered since the authentication hash values were generated.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention.

What is claimed is:

1. A method for authenticating a document, comprising:
inputting the document and generating document data;
determining at least one representation from the document data, the at least one representation comprising information derived from only a portion of the document;
determining assist information based on the at least one representation and the document data, the assist information usable to recover the at least one representation from the document data, the assist information usable to recover the at least one representation from a copy of the document containing noise; the assist information only enabling recovery of at least one alternate representation from a copy of the document in which the information has been altered, the at least one representation and the at least one alternate representation being different from one another;
generating at least one one-way hash of at least one of the at least one representation of the document data; and
appending authentication information to the document, the authentication information comprising the assist information and the at least one one-way hash.

2. The method of claim 1 further comprising:
digitally signing at least one of the at least one one-way hash and the assist information, wherein
the authentication information comprises the digitally signed at least one of the one-way hash and the assist information to the document.

3. The method of claim 2, further comprising;
encoding at least one of the assist information and the digitally signed at least one one-way hash; and
appending the encoded data to the document.

4. The method of claim 2, wherein the at least one one-way hash and the assist information are digitally signed using a same digital signing process.

5. The method of claim 2, wherein the at least one one-way hash and the assist information are digitally signed using separate digital signing processes.

6. The method of claim 1, further comprising encoding at least one of the assist information and the at least one one-way hash into a bar code.

7. The method of claim 1, further comprising encoding at least one of the assist information and the at least one one-way hash into a glyph block.

8. The method of claim 1, wherein the at least one one-way hash is a hash of both the at least one representation and the assist information.

9. The method of claim 1, wherein the at least one representation of the document data is at least one text string.

10. The method of claim 9, wherein the at least one text string is an ASCII text string.

11. The method of claim 1, wherein the document data is a document image.

12. The method of claim 11, wherein determining the at least one representation comprises determining information regarding a location of at least one connected component occurring in the document image.

13. The method of claim 11, wherein determining the at least one representation comprises determining a size of at least one connected component occurring in the document image.

14. The method of claim 11, wherein the Original representation includes information regarding a feature of at least one connected component occurring in the document image.

15. The method of claim 14, wherein the feature is at least one of a centroid and a membership threshold.

16. The method of claim 1, further comprising storing the assist information in a file.

17. The method of claim 1, further comprising determining two one-way hashes, wherein a first one-way hash is formed based on the at least one representation and a second one-way hash is formed based on the assist information.

18. The method of claim 17, further comprising digitally signing each of the first one-way hash and the second one-way hash.

19. A method for authenticating a document, comprising:
inputting the document and generating document data;
determining at least one representation from the document data, the at least one representation comprising information derived from only a portion of the document;
determining assist information usable to recover the at least one representation from the document data, the assist information usable to recover the at least one representation from a copy of the document containing noise; and
appending authentication information to the document, the authentication information comprising the assist information, wherein the document data is a document image,
determining the at least one representation comprises determining information regarding a location of at least one connected component occurring in the document image, and
determining the location of at least one connected component occurring in the document image comprises determining a position of at least one of a centroid, a shape and a membership threshold of at least one of the at least one connected component occurring in the document image.

20. A document authentication system that authenticates a document, comprising:
   means for inputting the document and generating document data;
   a document representation determining circuit, routine or application that determines at least one representation from the input document data, the representation comprising information derived from only a portion of the document;
   an assist information determining circuit, routine or application that determines assist information based on the at least one representation and the input document data, the assist information usable to reliably recover the at least one representation from the document data and from a copy of the document containing noise, the assist information only enabling recovery of at least one alternate representation from a copy of the document in which the information has been altered, the at least one representation and the at least one alternate representation being different from one another;
   a hash value determining circuit, routine or application that determines at least one hash of at least one of the at least one determined representation; and
   an appending circuit, routine or application that appends authentication information to the document, the authentication information comprising the assist information and the at least one hash.

21. The document authentication system of claim 20, further comprising a digital signature generating circuit, routine or application that generates at least one of a digitally-signed version of at least the at least one determined hash and a digitally-signed version of the assist information, wherein
   the authentication information comprises the at least one of a digitally-signed version of at least the at least one determined hash and a digitally-signed version of the assist information.

22. The document authentication system of claim 21, wherein the digital signature generating circuit, routine or application generates the digitally-signed version of the at least one hash and the assist information using a same digital signing process.

23. The document authentication system of claim 21, wherein the digital signature generating circuit, routine or application generates the digitally-signed version of the at least one hash and the assist information using separate digital signing processes.

24. The document authentication system of claim 21, further comprising an encoding circuit, routine or application that encodes at least one of the determined assist information, the at least one digitally-signed hash and the digitally signed version of the determined assist information.

25. The document authentication system of claim 24, further comprising a data appending circuit, routine or application that appends the encoded at least one of the determined assist information, the at least one digitally-signed hash and the digitally signed version of the determined assist information to a tangible copy of the document to authenticate the tangible copy of the document.

26. The document authentication system of claim 24, wherein the encoding circuit, routine or application encodes the at least one of the assist information, the at least one digitally-signed one-way hash and the digitally signed version of the determined assist information into a bar code.

27. The document authentication system of claim 24, wherein the encoding circuit, routine or application encodes the at least one of the assist information, the at least one digitally-signed one-way hash and the digitally signed version of the determined assist information into a glyph block.

28. The document authentication system of claim 20, wherein the hash generating circuit, routine or application determines, as the at least one one-way hash, a hash of the at least one representation and a hash of the assist information.

29. The document authentication system of claim 28, wherein the hash generating circuit, routine or application determines, as the at least one one-way hash, a first one-way hash that is formed based on the at least one representation and a second one-way hash that is formed based on the assist information.

30. The document authentication system of claim 28, further comprising a digital signature generating circuit, routine or application that generates a digitally-signed version of at least the hash of the at least one representation and the hash of the assist information.

31. The document authentication system of claim 20, wherein the at least one representation comprises at least one text string as the at least one representation.

32. The document authentication system of claim 31, wherein the at least one text string is an ASCII text string.

33. The document authentication system of claim 20, wherein the document data is a document image.

34. The document authentication system of claim 33, wherein the document representation determining circuit, routine or application determines, as the at least one representation, information regarding a location of at least one connected component occurring in the document image.

35. The document authentication system of claim 33, wherein the document representation determining circuit, routine or application determines, as the at least one representation, information regarding a size of at least one connected component occurring in the document image.

36. The document authentication system of claim 33, wherein the document representation determining circuit, routine or application determines, as the at least one representation, information regarding a feature of at least one connected component occurring in the document image.

37. The document authentication system of claim 33, wherein the feature is at least one of a centroid and a membership threshold.

38. The document authentication system of claim 33, wherein the assist information is stored in a file.

39. The method of claim 12, wherein determining the location of at least one connected component occurring in the document image comprises determining a position of at least one of a centroid, a shape and a membership threshold of at least one of the at least one connected component occurring in the document image.

* * * * *